United States Patent
Koreeda et al.

(10) Patent No.: US 7,280,276 B2
(45) Date of Patent: Oct. 9, 2007

(54) OBJECTIVE LENS

(75) Inventors: Daisuke Koreeda, Saitama-ken (JP);
Koichi Maruyama, Tokyo (JP);
Shuichi Takeuchi, Saitama-ken (JP);
Naohito Sasaki, Tokyo (JP)

(73) Assignee: PENTAX Corporation, Tokyo (JP)

( * ) Notice: Subject to any disclaimer, the term of this patent is extended or adjusted under 35 U.S.C. 154(b) by 219 days.

(21) Appl. No.: 10/937,290

(22) Filed: Sep. 10, 2004

(65) Prior Publication Data

US 2005/0057811 A1    Mar. 17, 2005

(30) Foreign Application Priority Data

Sep. 12, 2003    (JP)    ............................. 2003-320813

(51) Int. Cl.
*G11B 7/00*    (2006.01)
*G02B 1/10*    (2006.01)
(52) U.S. Cl. ...................................... 359/581; 359/586
(58) Field of Classification Search ................ 359/581, 359/586, 580
See application file for complete search history.

(56) References Cited

U.S. PATENT DOCUMENTS 6,449,221 B1 *    9/2002    Knight et al. ............. 369/13.35
2004/0264342 A1 *    12/2004    Hirayama ............... 369/112.01

FOREIGN PATENT DOCUMENTS

JP    2001-52366    2/2001

* cited by examiner

*Primary Examiner*—Fayez G. Assaf
(74) *Attorney, Agent, or Firm*—Greenblum & Bernstein, P.L.C.

(57) ABSTRACT

An objective lens on which a beam having parallel light fluxes is incident includes a single element lens and a reflection suppressing coating formed on at least one surface of the single element lens. The reflection suppressing coating is formed such that the reflectivity across a radius of the objective lens exhibits a local maximal value, and the reflection suppressing coating is formed to achieve the following condition:

$$0.6 < h1/hmax < 0.95,$$

wherein h1 denotes a distance between an optical axis and a position at which the reflectivity exhibits the local maximal value, and hmax denotes a distance between the optical axis and an outermost position of the effective diameter of the objective lens.

11 Claims, 4 Drawing Sheets

OBJECTIVE LENS

BACKGROUND OF THE INVENTION

The present invention relates to an objective lens which can be used in a optical disc system such as writing and/or reading device and device for creating a master of an optical disc.

Conventionally, optical disc reading/writing devices have been widely used. An optical disc reading/writing device is typically configured such that a laser beam emitted by a laser source is converged at a point in the vicinity of data recording surface of the optical disc to readout/write the information thereon. In order to perform the reading/writing operation efficiently, it is preferable that the quantity of light converged on the data recording surface is as much as possible. For this purpose, an objective lens for the optical disc reading/writing device is generally formed with a reflection suppressing coating on its surface. An example of such a coating is disclosed in Japanese Patent Provisional Publication No. P2001-52366A.

Generally, the reflection suppressing coating formed on the surface of the objective lens is configured such that its reflectivity for a ray of light at a predetermined wavelength (which will be referred to hereinafter as a design wavelength) incident thereon is minimum when an incident angle of the ray is zero degree. It is known that, for the wavelength of light different from the design wavelength, the reflection suppressing coating exhibits higher reflectivity (i.e., the reflection suppressing capability is lowered). Further, due to the inclination of the surface of the objective lens, an incident angle of a ray increase at an outer portion of the lens surface. As the incident angle of a ray is varied, the wavelength for which the reflection suppressing coating exhibits the minimum reflectivity is shifted to a shorter wavelength side. In other words, when rays having the same wavelength are incident on the central area (an area around the optical axis) and peripheral area (an area surrounding the central area) of the objective lens, the peripheral area exhibits a higher reflectively than the central area.

In the above-identified publication, in order to deal with the problem of varying the reflectivity due to the inclination of the lens surface, a lower design wavelength is employed for forming the reflection suppressing coating. With this configuration, increase of the reflectivity at the peripheral area is suppressed. Although the reflectivity at the central area increases according to the above configuration, the reflectivity as a whole (i.e., for the rays of light incident on an effective range of the objective lens) is well suppressed.

Recently, an optical disc having a higher recording density (i.e., having a larger data capacity) has been developed and used (e.g., DVD: digital versatile disc). When data is written onto and/or readout from such a disc, in accordance with its higher recording density, a high NA objective lens is used. By employing the higher NA lens, the diameter of a beam spot is well reduced.

The objective lens disclosed in the above-indicated publication is configured to reduce the reflectivity with respect to the light incident thereon so that loss of light is suppressed.

In an optical disc, since a pitch of adjacent data tracks is relatively small. In particular, an optical disc whose density is higher than that of the DVD has been suggested recently (e.g., Blue-Ray disc), which requires a higher NA lens. For such a high-density optical disc, it is desired that the intensity of a side lobe formed around the beam spot is well reduced.

SUMMARY OF THE INVENTION

The present invention is advantageous in that a high NA objective lens that can form a beam spot with well suppressed side lobe can be provided.

According to an aspect of the invention, there is provided an objective lens on which a beam having parallel light fluxes is incident having a single element lens and a reflection suppressing coating formed on at least one surface of the single element lens. The reflection suppressing coating is formed such that the reflectivity across a radius of the objective lens exhibits a local maximal value, and the reflection suppressing coating is formed to achieve the following condition;

$$0.6 < h1/h\max < 0.95,$$

wherein h1 denotes a distance between an optical axis and a position at which the reflectivity exhibits the local maximal value, and hmax denotes a distance between the optical axis and an outermost position of the effective diameter of the objective lens.

Optionally, the reflection suppressing coating may be formed such that the local maximal value Rmax of the reflectivity is greater than the reflectivity at the center of the objective lens and less than 15%.

Further optionally, the reflection suppressing coating may be formed such that the local maximal value Rmax of the reflectivity satisfies the condition;

$$((1-n)/(1+n))^2 < R\max < 0.15,$$

wherein n denotes a refractive index of the objective lens.

In a particular case, the reflection suppressing coating consists of a single layer of coating. Of course, the reflection suppressing coating may consist of multiple layers of coating.

Optionally, the reflection suppressing coating may be formed at least on a surface having a larger curvature of the single element lens.

In this case, the reflection suppressing coating may be formed such that the thickness nd of the reflection suppressing coating, which is measured in nanometers, on the optical axis satisfies the condition:

$$0.5\lambda < nd < 1.1\lambda,$$

wherein, $\lambda$ is a design wavelength measured in nanometers.

Further, the reflection suppressing coating may be formed to satisfy the conditions:

$$nd \cdot \cos\theta < t < nd; \text{ and}$$

$$0.68\lambda < nd/\sin(\theta\max) < 0.98\lambda,$$

wherein $\theta$ denotes an angle formed between a ray incident on the objective lens and a normal to the surface on which the reflection suppressing coating is formed at a point where the ray is incident, and t denotes the thickness of the reflection suppressing coating at a position where the ray is incident, and $\theta\max$ denotes a value of $\theta$ at the ray height of hmax.

Alternatively, the reflection suppressing coating may be formed to satisfy the conditions:

$$nd \cdot \cos^5\theta < t \leq nd \cdot \cos\theta; \text{ and}$$

$$0.98\lambda \leq nd/\sin(\theta\max) < 1.38\lambda,$$

wherein θ denotes an angle formed between a ray incident on the objective lens and a normal to the surface on which the reflection suppressing coating is formed at a point where the ray is incident, and t denotes the thickness of the reflection suppressing coating at a position where the ray is incident, and θmax denotes a value of θ at the ray height of hmax.

According to another aspect of the invention, there is provided an objective lens, which is provided with a single element lens and a reflection suppressing coating formed on at least one surface of the single element lens. The reflection suppressing coating is formed such that the reflectivity across a radius of the objective lens exhibits a local maximal value. The local maximal value is greater than a reflectivity at a central portion of the objective lens and less than 15%.

DETAILED DESCRIPTION OF THE EMBODIMENTS

Figure 1:
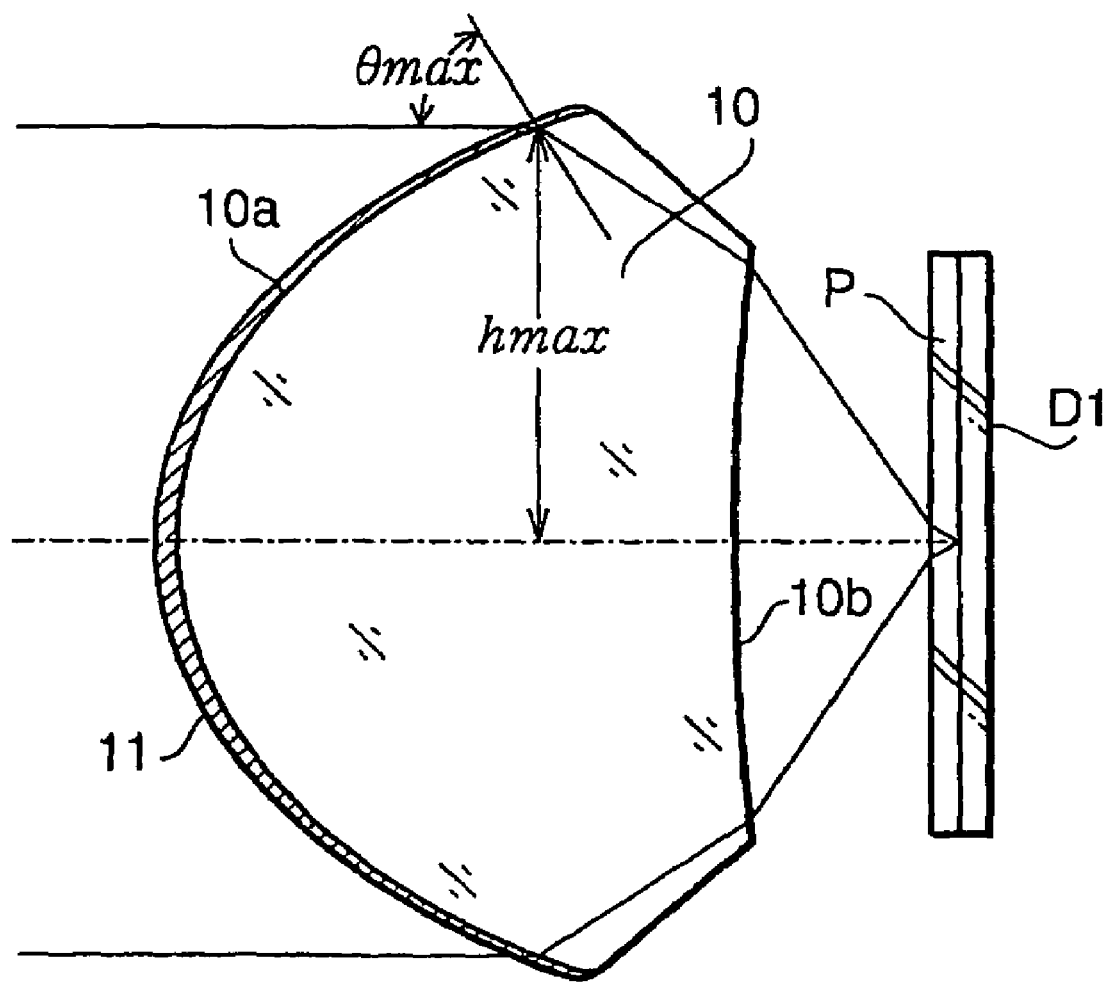
FIG. 1 shows a cross-sectional side view of an objective lens to which the present invention is applied and a protective layer of an optical disc.

FIG. 1 shows a cross-sectional side view of an objective lens 10, to which each of first to third embodiments according the present invention is applied, and an optical disc D1 having a protective layer P thereon.

The objective lens 10 is employed in an optical data reading/writing device (not show) that readouts/writes information on recording surface of an optical disc. Such an optical data reading/writing device typically includes a laser unit (not shown) which is provided on a left-hand side in FIG. 1 of the objective lens 10. The laser unit emits a laser beam having parallel light fluxes to the objective lens 10, which converges the incident laser beam to form a beam spot on the data recording surface of the optical disc D1 via the protective layer P. It should be noted that since the laser beam incident on the objective lens 10 consists of the parallel fluxes, coma will not be generated even if the objective lens is shifted in a direction parallel with the data recording surface of the optical disc D1 for tracking.

The objective lens 10 is a single element lens having a first surface 10a on the laser unit side, and a second surface 10b on the optical disc side. According to the embodiments, a focal length f of the objective lens is 1.77 mm, an NA (numerical aperture) is 0.85, a distance from an optical axis to the outermost position of its effective diameter hmax is 1.50 mm. Further, according to the embodiments, the wavelength λ of the laser beam for reading/writing data is 407 nm. Further numerical details of the objective lens 10 and the protective layer P of the optical disc D1 are indicated in Table 1 below.

TABLE 1

| No. | r | d | n | description |
| --- | --- | --- | --- | --- |
| 1 | 1.287 | 1.850 | 1.71142 | objective lens 10 |
| 2 | −24.984 | 0.646 | | |
| 3 | ∞ | 0.100 | 1.62150 | Protective layer P |
| 4 | ∞ | 0.000 | | data recording surface |

In Table 1, "No." denotes a surface number of the objective lens 10 and the protective layer P from the laser unit side (i.e., left-hand side in FIG. 1), "r" denotes a radius of curvature of each surface measured in mm (millimeters), "d" represents a thickness of a lens or distance between the lenses on the optical axis, measured in mm, "n" denotes a refractive index at the wavelength λ for reading/writing data on the optical disc D1, and "description" indicates the optical element corresponding to the surface number.

Each of the first surface 10a and the second surface 10b is an aspherical surface. The shape of the spherical surface is expressed by a function below:

$$X(h) = \frac{Ch^2}{1 + \sqrt{1 - (K+1)C^2h^2}} + A_4h^4 + A_6h^6 + A_8h^8 + A_{10}h^{10} + A_{12}h^{12}$$

where, X(h) is a sag amount (i.e., a distance between a plane tangent to the spherical surface on the optical axis and a point on the aspherical surface at height from the optical axis is h), C is a curvature (C=1/r) of the aspherical surface on the optical axis, K is a conical coefficient, and $A_4$, $A_6$, $A_8$, $A_{10}$ and $A_{12}$ are fourth, sixth, eighth, tenth and twelfth aspherical coefficients.

The coefficients defining the surfaces Nos. 1 and 2 are indicated in Table 2. In tables, "E" represents exponential (ten's power). For example, 1.72200E-02=1.72200×10$^{-2}$.

TABLE 2

| | No. 1 (10a) | No. 2 (10b) |
| --- | --- | --- |
| K | −0.7000 | 0.0000 |
| $A_4$ | 1.72200E−02 | 1.72700E−01 |
| $A_6$ | 4.80900E−03 | −2.25700E−01 |
| $A_8$ | 7.57300E−04 | 1.75140E−01 |
| $A_{10}$ | 5.19500E−04 | −7.58210E−02 |
| $A_{12}$ | −6.55900E−05 | 1.40480E−02 |

For the sake of brevity, in the three embodiments described hereinafter, the same configuration of the objective lens indicated above is used. It should be appreciated that the configuration described above is an exemplary one and the invention need not be limited to the same.

A reflection suppression coating is formed on at least one surface of the objective lens 10 configured as above. It should be noted that such a coating can be formed on both surfaces. According to the embodiments described later, the reflection suppressing coating is formed on the first surface 10a.

In order to suppress the side lobe, the reflection suppressing coating is formed so that the reflectivity across the radius of the objective lens 10 exhibits a local maximal value. Further, the coating is formed to achieve the following condition (1).

$$0.6 < h1/hmax < 0.95 \tag{1}$$

where, h1 denotes a distance between the optical axis and a position at which the reflectivity exhibits the local maximal value, and hmax denotes a distance between the optical axis and an outermost position of the effective diameter of the objective lens 10.

Configured as above, the central area of the first surface 10a is formed with the coating such that the reflectivity in the central area is relatively small. Therefore, the central area of the beam spot formed by the objective lens 10 on the data recording surface of the optical disc D1 has a relatively high intensity. Further, as the position where the reflectivity has the local maximal value satisfies the condition (1), the intensity of the side lobe can be reduced.

When h1/hmax is lower than the lower limit of condition (1), the intensity of the beam spot at the central area is lowered. In addition, in such a case, the effect of reducing the intensity of the side lobe is weakened, or in the worst case, is not obtained. When h1/hmax exceeds the upper limit of condition (1), the effect of reducing the intensity of the side lobe is weakened.

When the objective lens 10 is used in a data reading/writing device that readouts/writes data on an optical disc, the laser beam incident on the objective lens 10 has a wavelength appropriate to readout/write the data on the optical disc. Such a wavelength will be referred to as a design wavelength. If the objective lens is compatible for a plurality of types of optical discs having different data recording densities and/or thicknesses of protective layers, the design wavelength is defined as a wavelength of the beam used for reading/writing the data with respect to the optical disc having the highest data recording density.

By increasing the reflectivity of the first surface 10a on which the reflection suppressing coating is formed, the effect of reducing the intensity of the side lobe is improved. However, by increasing the reflectivity, the central intensity of the beam spot formed by the laser beam passed through the objective lens 10 is lowered. In order to balance the intensity of the central area of the beam spot and the reduced intensity of the side lobe, it is preferable that the local maximal value Rmax of the reflectivity satisfies condition (2).

$$((1-n)/(1+n))^2 < Rmax < 0.15 \tag{2}$$

where n is a refractive index of the objective lens 10.

Incidentally, it is preferable that the reflection suppressing coating is formed at least on a surface having a larger curvature. The larger the curvature is, the larger the incident angle of a ray at the peripheral portion of the objective lens is. When the incident angle is larger, the reflectivity with respect to the ray increases. Therefore, by forming the reflection suppressing coating on the surface having the larger curvature, the conditions (1) and/or (2) can be realized easily, and the reflectivity at the peripheral area becomes higher than that at the central area, thereby the intensity of the side lobe being reduced effectively.

By forming the reflection suppressing coating with a single layer, a manufacturing cost can be reduced. Further, by employing the single layer coating, deterioration of the reflection suppressing characteristic when the actual wavelength is shifted from the design wavelength can be lessened. On the other hand, it is possible to use a multi-layer coating as the reflection suppressing coating. In such a case, a wavelength range to which the coating is effective can be enhanced. Therefore, either the single-layer or multi-layer coating can be selected depending on the purpose of usage and/or usage environment.

Preferably, the reflection suppressing coating 11 is formed such that the thickness nd of the coating 11 (measured in nanometers) on the optical axis satisfies condition (3).

$$0.5\lambda < nd < 1.1\lambda \tag{3}$$

where, $\lambda$ is the design wavelength measured in nanometers.

When condition (3) is satisfied, the effect of reducing the intensity of the side lobe can be enhanced. When the thickness nd exceeds the upper limit (i.e., $1.1\lambda$), the effect of reducing the intensity of the side lobe is weakened. When the thickness is smaller than the lower limit (i.e., $0.5\lambda$), the intensity of the side lobe increased.

Hereinafter, numerical configurations of the reflection suppressing coatings according to first through third embodiments will be described.

First Embodiment

According to the first embodiment, as described above, the reflection suppressing coating 11 is formed on the first surface 10a, which has a larger curvature than the second surface 10b of the objective lens 10. It should be noted that the thickness of the reflection suppressing coating 11 shown in FIG. 1 is exaggerated for the sake of explanation.

The reflection suppressing coating 11 is configured such that $nd=0.68\lambda$ and $\theta max=65.57°$, where nd denotes an optical thickness of the reflection suppressing coating 11 on the optical axis of the objective lens 10 (i.e., at the center of the first surface 10a) measured in nm (nanometers), and $\theta max$ denotes an angle (measured in degrees) formed between a ray incident on the first surface 10a at the ray height (i.e., a distance from the optical axis) of hmax and a normal to the incident position on the first surface 10a.

The reflection suppressing coating 11 is formed in accordance with a design wavelength $\lambda$, which is used for reading/writing data on the optical disc D1. As described above, according to the embodiments, $\lambda=407$ nm.

Figure 2:
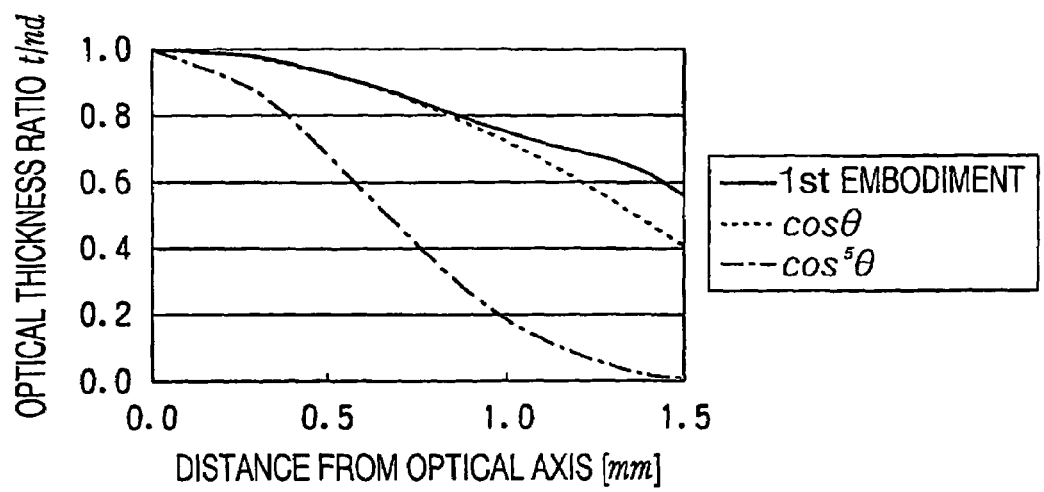
FIG. 2 is a graph showing a coating thickness distribution across a radius of an objective lens according to a first embodiment.

FIG. 2 is a graph showing distributions of the thickness ratios t/nd of the reflection suppressing coating 11 (solid line) and comparative examples (broken line and dashed line). In FIG. 2, the horizontal axis represents the distance h from the optical axis, and the vertical axis represents a ratio of the thickness t at the distance h to the thickness nd on the optical axis.

As mentioned above, the solid line shows the distribution of the thickness ratio of the reflection suppressing coating 11 according to the first embodiment. The broken line shows the distribution of a conventional reflection suppressing coating which is typically represented by $\cos\theta$. The dashed line shows the distribution represented by $\cos^5\theta$. It should be noted that $\theta$ denotes the angle formed between a ray incident on the objective lens and a normal to the first surface 10a at a point where the ray is incident. Since the ray of the laser beam incident on the objective lens 10 is parallel with the optical axis, the angle θ is an incident angle of each ray with respect to the first surface 10*a*.

It is appreciated that, from FIG. 2, the thickness ratio distribution of the reflection suppressing coating 11 according to the first embodiment is greater than the distributions of the comparative examples. Further, the thickness t of the reflection suppressing coating 11 at the peripheral area of the objective lens 10 is larger than the thickness of the conventional reflection suppressing coating (t>nd·cos θ), and less than the thickness nd on the optical axis (i.e., t<nd). As above, the reflection suppressing coating 11 is formed to satisfy condition (4).

$$nd \cdot \cos \theta < t < nd \qquad (4)$$

Further to the above, the reflection suppressing coating 11 is preferably formed to satisfy condition (5).

$$0.68\lambda < nd/\sin(\theta max) < 0.98\lambda \qquad (5)$$

When the thickness nd of the reflection suppressing coating on the optical axis satisfies condition (5), the effect of reducing the intensity of the side lobe is enhanced. If the thickness nd exceeds the upper limit, the effect of reducing the intensity of the side lobe is weakened, while if the thickness nd is smaller than the lower limit, the intensity of the side lobe is increased.

Figure 3:
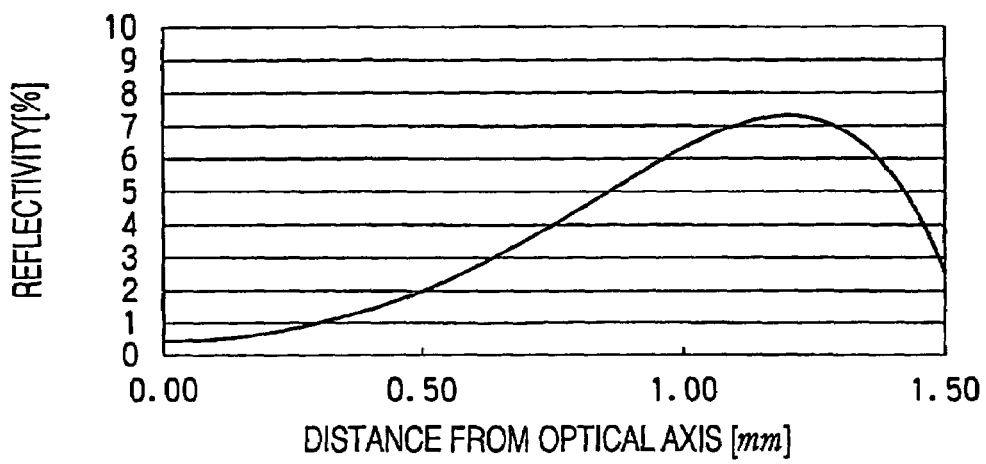
FIG. 3 is a graph showing a reflectivity distribution across a radius of the objective lens according to the first embodiment.

FIG. 3 is a graph showing a reflectivity distribution across a radius of the objective lens 10 according to the first embodiment. In the graph, the horizontal axis represents a distance from the optical axis, and the vertical axis represents the reflectivity on the first surface 10*a*.

As shown in FIG. 3, the reflectivity of the reflection suppressing coating 11 is very small at the central area of the first surface 10*a*, gradually increases toward the peripheral area and has a local maximal value (also the maximum value) with respect to a ray incident on the objective lens 10 at a distance of approximately 1.2 mm.

Figure 4:
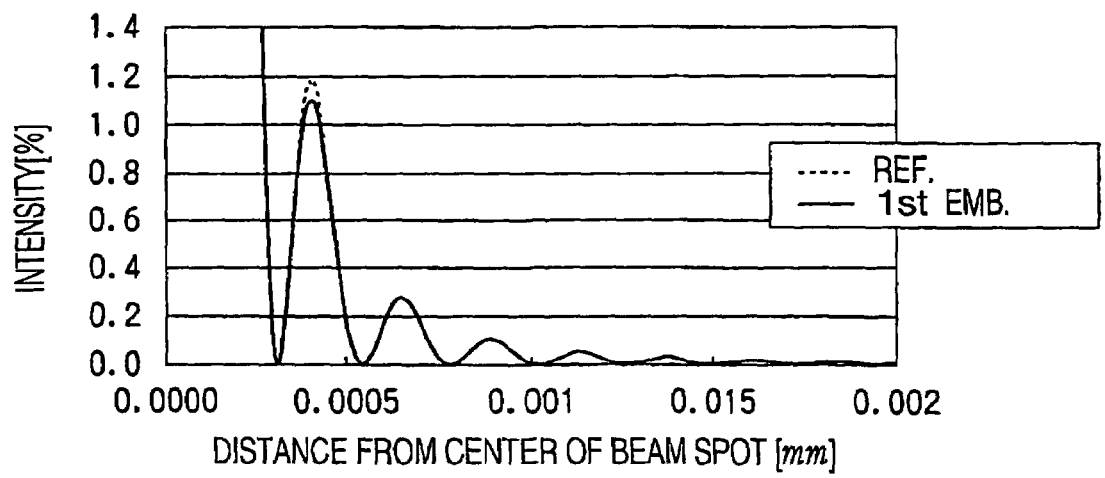
FIG. 4 is a graph showing an intensity distribution of a beam spot formed by the objective lens according to the first embodiment.

FIG. 4 is a graph showing an intensity distribution of a beam spot formed by the objective lens 10 according to the first embodiment. In FIG. 4, the solid line represents the distribution of the intensity of the beam spot formed by the laser beam passed through the objective lens 10. The broken line represents a reference distribution of the intensity formed by a reference lens which is assumed to have a constant reflectivity regardless of the distance from the optical axis. As can be seen in FIG. 4, when the objective lens 10 according to the first embodiment is used, the side lobe closest to the center of the beam spot (and having the largest value) is suppressed in comparison with the side lobe formed by the reference lens. Specifically, according to the first embodiment, the intensity of the side lobe is reduced by approximately 6.9% in comparison with the reference distribution.

Second Embodiment

The second embodiment is also configured such that the reflection suppressing coating 11 is formed on the first surface 10*a*, which has a larger curvature than the second surface 10*b* of the objective lens 10.

According to the second embodiment, nd=0.86λ and θmax=65.57°.

Figure 5:
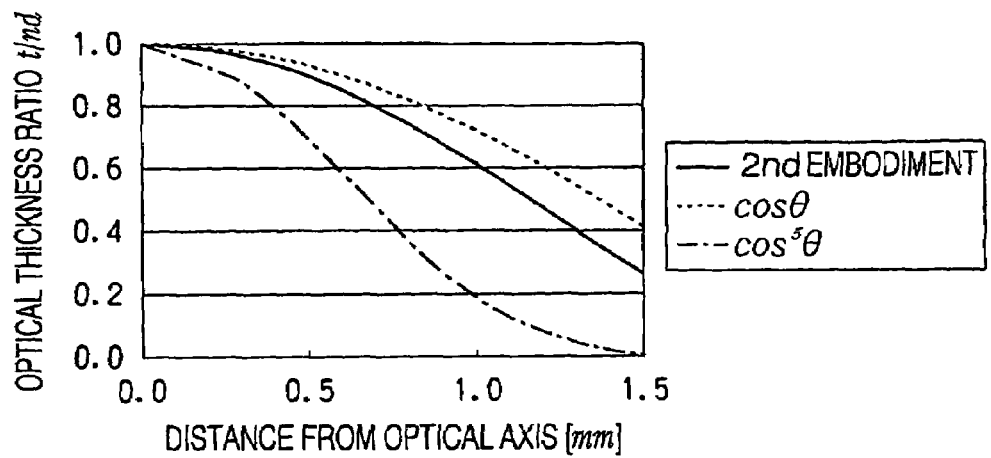
FIG. 5 is a graph showing a coating thickness distribution across a radius of an objective lens according to a second embodiment.

FIG. 5 is a graph showing distributions of the thickness ratios t/nd of the reflection suppressing coating 11 (solid line) and comparative examples (broken line and dashed line).

It is appreciated that, from FIG. 5, the thickness ratio distribution of the reflection suppressing coating 11 according to the second embodiment is equal to or smaller than the distribution represented by cos θ (t<nd·cos θ), and greater than the distribution represented by $\cos^5 \theta$ (t>nd·$\cos^5 \theta$). That is, according to the second embodiment, the reflection suppressing coating 11 is formed to satisfy condition (6).

$$nd \cdot \cos^5 \theta < t \leq nd \cdot \cos \theta \qquad (6)$$

Further to the above, the reflection suppressing coating 11 is preferably formed to satisfy condition (7).

$$0.98\lambda \leq nd/\sin(\theta max) < 1.38\lambda \qquad (7)$$

When the thickness nd of the reflection suppressing coating on the optical axis satisfies condition (7), the effect of reducing the intensity of the side lobe is enhanced. If the thickness nd exceeds the upper limit, the effect of reducing the intensity of the side lobe is weakened, while if the thickness nd is smaller than the lower limit, the intensity of the side lobe is increased.

Figure 6:
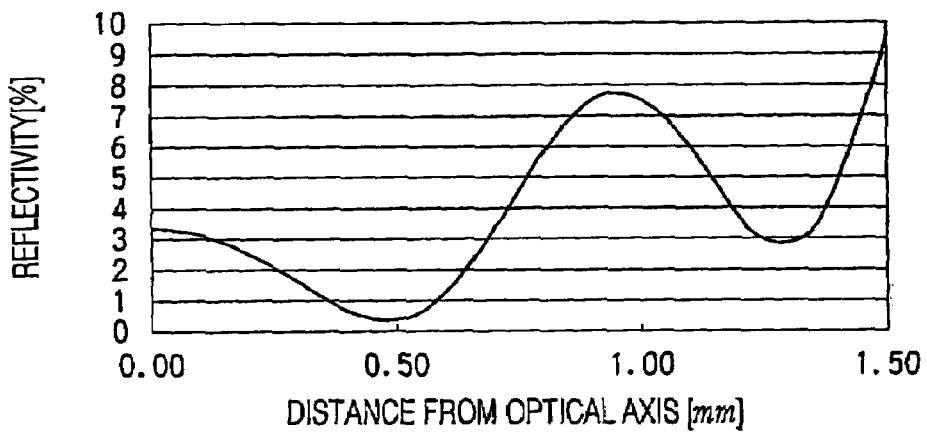
FIG. 6 is a graph showing a reflectivity distribution across a radius of the objective lens according to the second embodiment.

FIG. 6 is a graph showing a reflectivity distribution across a radius of the objective lens 10 according to the second embodiment.

As shown in FIG. 6, the reflectivity of the reflection suppressing coating 11 is very small in an area of the first surface 10*a* where h is approximately 0.5 mm or smaller, gradually increases toward the peripheral area and has a local maximal value with respect to a ray incident on the objective lens 10 at a distance of approximately 1.0 mm. The intensity then decreases toward the peripheral area and then increases again and has the maximum value at the end of the effective area (h=hmax=1.5 mm).

Figure 7:
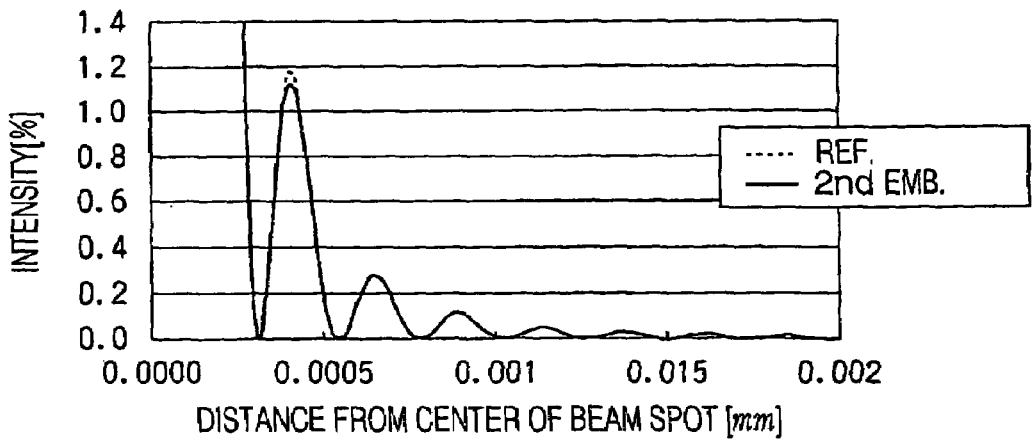
FIG. 7 is a graph showing an intensity distribution of a beam spot formed by the objective lens according to the second embodiment.

FIG. 7 is a graph showing an intensity distribution of a beam spot formed by the objective lens 10 according to the second embodiment. As can be seen in FIG. 7, when the objective lens 10 according to the second embodiment is used, the side lobe closest to the center of the beam spot (and having the largest value) is suppressed in comparison with the side lobe formed by the reference lens. Specifically, according to the second embodiment, the intensity of the side lobe is reduced by approximately 5.1% in comparison with the reference distribution.

Third Embodiment

The third embodiment is also configured such that the reflection suppressing coating 11 is formed on the first surface 10*a*, which has a larger curvature than the second surface 10*b* of the objective lens 10. According to the third embodiment, the reflection suppressing coating 11 includes a first layer formed on the first surface 10*a*, and a second layer formed on the first layer.

According to the third embodiment, a first optical thickness nd1 (i.e., nd of the first layer) is 0.09λ, and a second optical thickness nd2 (i.e., nd of the second layer) is 0.8λ, and θmax=65.57°.

Figure 8:
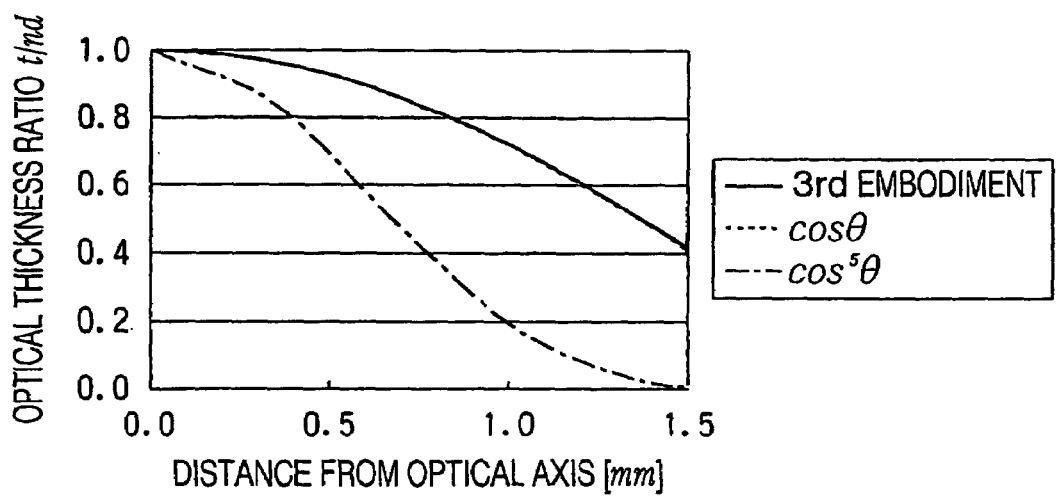
FIG. 8 is a graph showing a coating thickness distribution across a radius of an objective lens according to a third embodiment.

FIG. 8 is a graph showing distributions of the thickness ratios t/nd of the reflection suppressing coating 11 (solid line) and comparative examples (broken line and dashed line). It should be noted that, in this case, the thickness t is the sum of the thicknesses of the first layer and second layer.

It is appreciated that, from FIG. 8, the distribution of the thickness ratio t/nd (nd=nd1+nd2) of the reflection suppressing coating 11 according to the third embodiment is substantially equal to the distribution represented by cos θ. That is, the reflection suppressing coating 11 according to the third embodiment is formed to satisfy condition (6) above.

Figure 9:
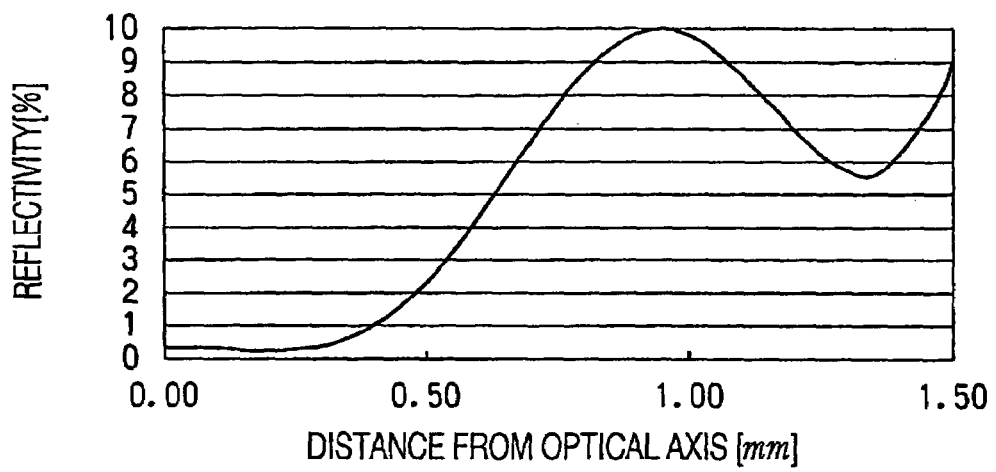
FIG. 9 is a graph showing a reflectivity distribution across a radius of the objective lens according to the third embodiment.

FIG. 9 is a graph showing a reflectivity distribution across a radius of the objective lens 10 according to the third embodiment.

As shown in FIG. 9, the reflectivity of the reflection suppressing coating 11 is very small in an area of the first surface 10a where h is approximately 0.5 mm or smaller, gradually increases toward the peripheral area and has a local maximal value (which is also the maximum value) with respect to a ray incident on the objective lens 10 at a distance of approximately 1.0 mm.

Figure 10:
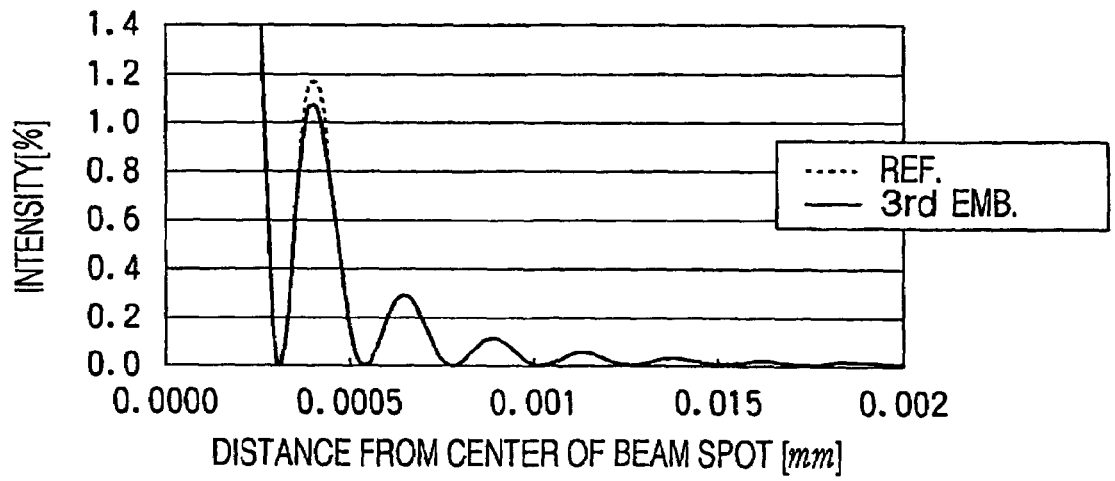
FIG. 10 is a graph showing an intensity distribution of a beam spot formed by the objective lens according to the third embodiment.

FIG. 10 is a graph showing an intensity distribution of a beam spot formed by the objective lens 10 according to the third embodiment. As can be seen in FIG. 10, when the objective lens 10 according to the third embodiment is used, the side lobe closest to the center of the beam spot (and having the largest value) is suppressed in comparison with the side lobe formed by the reference lens. Specifically, according to the second embodiment, the intensity of the side lobe is reduced by approximately 8.5% in comparison with the reference distribution.

By employing the multi-layer coating, a wavelength range in which the reflectivity is reduced can be made wider. The characteristic shown in FIG. 8 is substantially the same as the example of cos θ. It should be note that this characteristic is only an example, and the characteristic when the multi-layer coating is employed need not be limited to this distribution. By appropriately designing each layer, characteristics similar to those of the first and second embodiments can be realized.

Table 6 shows the values of each embodiment regarding the above described conditions (1), (2), (3), (5) and (7). It should be noted that, in condition (2), $((1-n)/(1+n))^2$ for each embodiment has the same value, 0.069.

TABLE 6

| No. | condition | 1st emb. | 2nd emb. | 3rd emb. |
|---|---|---|---|---|
| (1) | 0.60 < h1/hmax ≦ 0.95 | 0.80 | 0.63 | 0.63 |
| (2) | 0.069 < Rmax < 0.15 | 0.074 | 0.076 | 0.099 |
| (3) | 0.5λ < nd < 1.1λ | 0.68λ | 0.86λ | 0.89λ |
| (5) | 0.68λ < nd/sinθmax < 0.98λ | 0.74 | — | — |
| (7) | 0.98λ ≦ nd/sinθmax < 1.38λ | — | 0.94λ | — |

As indicated in Table 6, all the embodiments are configured to satisfy respective conditions described above, and the objective lens according to each embodiment can suppress the intensity of the side lobe effectively with allowing light sufficient for reading/writing data on the optical disc to transmit.

As shown in FIGS. 3, 6 and 9, the local maximal value Rmax of the reflectivity is greater than the reflectivity at the center of the objective lens 10. Further, as indicated in Table 6, the local maximal value Rmax is less than 15%.

In preferred embodiments described above, the reflection suppressing coating is formed on a surface having a larger curvature. However, the invention should not be limited to such a configuration. It is also possible to form the reflection suppressing coating on the surface having a smaller curvature, or on both surfaces.

Although the embodiments are directed to the objective lens for optical data reading/writing device, the objective lens configured as above can be applied to any device which requires a high NA objective lens.

The present disclosure relates to the subject matter contained in Japanese Patent Application No. 2003-320813, filed on Sep. 12, 2003, which is expressly incorporated herein by reference in its entirety.

What is claimed is:

1. An objective lens on which a beam having parallel light fluxes is incident, comprising:
   a single element lens; and
   a reflection suppressing coating formed on at least one surface of the single element lens,
   the reflection suppressing coating being formed such that the reflectivity across a radius of the objective lens exhibits a local maximal value,
   the reflection suppressing coating being formed to achieve a condition:

0.6<h1/hmax<0.95, wherein h1 denotes a distance between an optical axis and a position at which the reflectivity exhibits the local maximal value, and hmax denotes a distance between the optical axis and an outermost position of the effective diameter of the objective lens.

2. The objective lens according to claim 1,
   wherein the reflection suppressing coating is formed such that the local maximal value Rmax of the reflectivity is greater than the reflectivity at the center of the objective lens and less than 15%.

3. The objective lens according to claim 1,
   wherein the reflection suppressing coating is formed such that the local maximal value Rmax of the reflectivity satisfies a condition:

$((1-31 n)/(1+n))^2$<Rmax<0.15, wherein n denotes a refractive index of the objective lens.

4. The objective lens according to claim 1, wherein the reflection suppressing coating consists of a single layer of coating.

5. The objective lens according to claim 1, wherein the reflection suppressing coating consists of multiple layers of coating.

6. The objective lens according to claim 1, wherein the reflection suppressing coating is formed at least on a surface having a larger curvature of the single lens element lens.

7. The objective lens according to claim 6,
   wherein the reflection suppressing coating is formed such that an optical thickness nd of the reflection suppressing coating, which is measured in nanometers, on the optical axis satisfies a condition:

0.5λ<nd<1.1λ, wherein, λ is a design wavelength measured in nanometers.

8. The objective lens according to claim 7,
   wherein the reflection suppressing coating is formed to satisfy conditions:

nd·cos θ<t<nd; and 0.68λ<nd/sin(θmax)<0.98λ, wherein θ denotes an angle formed between a ray incident on the objective lens and a normal to the surface on which the reflection suppressing coating is formed at a point where the ray is incident, and t denotes the thickness of the reflection suppressing coating at a position where the ray is incident, and θmax denotes a value of θ at the ray height of hmax.

9. The objective lens according to claim 7,
wherein the reflection suppressing coating is formed to satisfy conditions:

$nd \cdot \cos^5 \theta < t \leq nd \cdot \cos \theta$; and $0.98\lambda \leq nd/\sin(\theta max) < 1.38\lambda$, wherein θ denotes an angle formed between a ray incident on the objective lens and a normal to the surface on which the reflection suppressing coating is formed at a point where the ray is incident, and t denotes the thickness of the reflection suppressing coating at a position where the ray is incident, and θmax denotes a value of θ at the ray height of hmax.

10. The objective lens according to claim 1,
wherein the reflection suppressing coating is formed such that an optical thickness nd of the reflection suppressing coating, which is measured in nanometers, on the optical axis satisfies a condition:

$0.5\lambda < nd < 1.1\lambda$, wherein, λ is a design wavelength measured in nanometers.

11. An objective lens on which a beam having parallel light fluxes is incident, comprising:
a single element lens; and
a reflection suppressing coating formed on at least one surface of the single element lens,
the reflection suppressing coating being formed such that the reflectivity across a radius of the objective lens exhibits a local maximal value, the local maximal value being greater than a reflectivity at a central portion of the objective lens and less than 15%.

* * * * *